US011243541B2

(12) United States Patent
Kazemi et al.

(10) Patent No.: US 11,243,541 B2
(45) Date of Patent: Feb. 8, 2022

(54) MOTION-PLAN VALIDATOR FOR AUTONOMOUS VEHICLE

(71) Applicant: UATC, LLC, San Francisco, CA (US)

(72) Inventors: Moslem Kazemi, Allison Park, PA (US); Anthony Joseph Stentz, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 733 days.

(21) Appl. No.: 15/980,264

(22) Filed: May 15, 2018

(65) Prior Publication Data

US 2019/0294170 A1 Sep. 26, 2019

Related U.S. Application Data

(60) Provisional application No. 62/646,964, filed on Mar. 23, 2018.

(51) Int. Cl.
*G05D 1/02* (2020.01)
*G08G 1/16* (2006.01)
*G05D 1/00* (2006.01)

(52) U.S. Cl.
CPC ......... *G05D 1/0214* (2013.01); *G05D 1/0221* (2013.01); *G05D 1/0274* (2013.01); *G08G 1/166* (2013.01); *G05D 1/0088* (2013.01)

(58) Field of Classification Search
None
See application file for complete search history.

(56) References Cited

U.S. PATENT DOCUMENTS

| | | | |
|---|---|---|---|
| 9,645,577 B1 * | 5/2017 | Frazzoli | B60W 30/18163 |
| 9,977,430 B2 * | 5/2018 | Shalev-Shwartz | G06N 3/006 |
| 10,593,202 B1 * | 3/2020 | Christensen | G08G 1/0965 |
| 10,769,525 B2 * | 9/2020 | Redding | G06N 3/006 |
| 10,860,019 B2 * | 12/2020 | Censi | G05D 1/0257 |
| 2017/0285585 A1 * | 10/2017 | Weast | G06N 5/046 |

\* cited by examiner

*Primary Examiner* — Todd Melton
(74) *Attorney, Agent, or Firm* — Dority & Manning, P.A.

(57) ABSTRACT

The present disclosure is directed to validating motion plans for autonomous vehicles. In particular, the methods, devices, and systems of the present disclosure can: receive data indicating a motion plan of an autonomous vehicle through an environment of the autonomous vehicle; receive data indicating one or more inputs utilized in generating the motion plan; and determine, based at least in part on the data indicating the motion plan and the data indicating the input(s), whether execution of the motion plan by the autonomous vehicle would violate one or more predetermined constraints applicable to motion plans for the autonomous vehicle.

20 Claims, 4 Drawing Sheets

MOTION-PLAN VALIDATOR FOR AUTONOMOUS VEHICLE

PRIORITY CLAIM

This application claims priority to U.S. Patent Application Ser. No. 62/646,964, filed Mar. 23, 2018, and entitled "MOTION-PLAN VALIDATOR FOR AUTONOMOUS VEHICLE," the disclosure of which is incorporated by reference herein in its entirety.

FIELD

The present disclosure relates generally to autonomous vehicles. More particularly, the present disclosure relates to validating motion plans for autonomous vehicles.

BACKGROUND

An autonomous vehicle is a vehicle that is capable of sensing its environment and navigating with minimal or no human input. In particular, an autonomous vehicle can observe its surrounding environment using a variety of sensors and identify an appropriate path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include receiving, by a computing system comprising one or more computing devices, data indicating a motion plan of an autonomous vehicle through an environment of the autonomous vehicle. The method can also include receiving, by the computing system, data indicating one or more inputs utilized in generating the motion plan. The method can further include determining, by the computing system and based at least in part on the data indicating the motion plan and the data indicating the one or more inputs, whether execution of the motion plan by the autonomous vehicle would violate one or more predetermined constraints applicable to motion plans for the autonomous vehicle.

Another example aspect of the present disclosure is directed to a system. The system can include one or more processors and a memory storing instructions that when executed by the one or more processors cause the system to perform operations. The operations can include generating, using a machine-learning model and based at least in part on one or more inputs, a motion plan of an autonomous vehicle through an environment of the autonomous vehicle. The operations can also include determining, based at least in part on the motion plan and the one or more inputs, whether execution of the motion plan by the autonomous vehicle would violate one or more predetermined constraints applicable to motion plans for the autonomous vehicle. The operations can further include determining, based at least in part on whether execution of the motion plan by the autonomous vehicle would violate the one or more predetermined constraints, whether to execute the motion plan.

A further example aspect of the present disclosure is directed to an autonomous vehicle. The autonomous vehicle can include one or more sensors configured to generate data describing an environment of the autonomous vehicle. The autonomous vehicle can also include one or more vehicle controls configured to operate the autonomous vehicle. The autonomous vehicle can further include one or more processors and a memory storing instructions that when executed by the one or more processors cause the autonomous vehicle to perform operations. The operations can include generating, using a machine-learning model and based at least in part on one or more inputs determined based at least in part on data generated by the one or more sensors, a motion plan of the autonomous vehicle through the environment. The operations can also include determining, based at least in part on the motion plan and the one or more inputs, whether execution of the motion plan by the autonomous vehicle would violate one or more predetermined constraints applicable to motion plans for the autonomous vehicle. The operations can further include determining, based at least in part on whether execution of the motion plan by the autonomous vehicle would violate the one or more predetermined constraints, whether to interface with the one or more vehicle controls to execute the motion plan.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Example aspects of the present disclosure are directed to validating motion plans of an autonomous vehicle. In particular, a computing system (e.g., a motion-planning system, and/or the like) can generate (e.g., using a machine-learning model, an iterative linear quadratic regulator (ILQR), and/or the like) a motion plan of an autonomous vehicle through its environment. In accordance with aspects of the disclosure, the computing system can determine whether execution of the motion plan would violate one or more predetermined constraints applicable to motion plans for the autonomous vehicle. Based at least in part on whether execution of the motion plan would violate the predetermined constraint(s), the computing system can determine whether to execute the motion plan.

The computing system can generate the motion plan based at least in part on one or more inputs. For example, such input(s) can include map data describing one or more aspects of the environment (e.g., locations of travelways, lanes within travelways, traffic signage, signals, and/or the like); one or more objects of the environment (e.g., other vehicles, pedestrians, buildings, and/or the like) perceived by the computing system based at least in part on data generated by one or more sensors of the autonomous vehicle; and/or one or more predicted locations (e.g., future locations, and/or the like) of such object(s) determined by the computing system based at least in part on data generated by the sensor(s) of the autonomous vehicle.

In some embodiments, the constraint(s) can include, for example, the autonomous vehicle avoiding: a collision with an object of the environment (e.g., another vehicle, a pedestrian, a building, an object in the travelway, and/or the like); physical interaction with a travelway boundary of the environment (e.g., a curb, shoulder, median, sidewalk, building, and/or the like); crossing, exceeding, and/or the like a travelway boundary of the environment (e.g., a line delineating a lane of a travelway, and/or the like); violating a traffic law of the environment (e.g., failing to yield to another vehicle, a pedestrian, and/or the like, failing to comply with a traffic signal or signage, crossing a solid and/or double line delineating a lane of a travelway, and/or the like); and/or violating one or more vehicle-platform parameters of the autonomous vehicle (e.g., exceeding one or more steering, angle, force, acceleration, deceleration limits, and/or the like of the autonomous vehicle).

In some embodiments, the computing system can receive data indicating the generated motion plan, data indicating the input(s), and/or the like. In some of such embodiments, the computing system can determine whether execution of the motion plan would violate the constraint(s) based at least in part on the data indicating the motion plan, the data indicating the input(s), and/or the like. For example, the constraint(s) can include the autonomous vehicle avoiding crossing a solid and/or double line delineating a lane of a travelway, and/or the like; the data indicating the input(s) can indicate one or more positions (e.g., at various times, and/or the like) of a solid and/or double line delineating a lane of a travelway in the environment of the autonomous vehicle (e.g., with respect to the autonomous vehicle, and/or the like); the motion plan can indicate the autonomous vehicle will (e.g., at a particular time in the future, and/or the like) cross the solid and/or double line delineating the lane of the travelway in the environment; and based at least in part on a determination that the autonomous vehicle will cross the solid and/or double line delineating the lane of the travelway in the environment, the computing system can determine execution of the motion plan would violate the constraint(s).

In some embodiments, the computing system can determine that execution of the motion plan by the autonomous vehicle would not violate the constraint(s). Responsive to such a determination, the computing system can interface (e.g., via a vehicle-control system, and/or the like) with one or more controls of the autonomous vehicle to execute the motion plan.

In other embodiments, the computing system can determine that execution of the motion plan by the autonomous vehicle would violate at least one of the constraint(s). In some of such embodiments, for each of the constraint(s) that would be violated, the computing system can determine: a type, magnitude, and/or the like of a violation of the constraint; one or more objects of the environment associated with such violation; and/or based at least in part on the type, magnitude, associated object(s), and/or the like, whether to execute the motion plan.

For example, a constraint that would be violated could include physical interaction between the autonomous vehicle and a travelway boundary of its environment (e.g., hitting a curb, and/or the like); the computing system can determine a type (e.g., collision with an inanimate object, and/or the like) and/or magnitude (e.g., relatively significant, and/or the like) of the violation, one or more objects of the environment associated with the violation (e.g., the curb, and/or the like); and based at least in part on the determined type, magnitude, and/or associated object(s), the computing system can determine whether to execute the motion plan (e.g., determine to not execute the motion plan, and/or the like).

Additionally or alternatively, a constraint that would be violated could include the autonomous vehicle crossing, exceeding, and/or the like a travelway boundary of its environment (e.g., a legal, minor intrusion into an adjacent lane, and/or the like); the computing system can determine a type (e.g., legal intrusion of adjacent lane, and/or the like) and/or magnitude (e.g., relatively minor, and/or the like) of the violation, one or more objects of the environment associated with the violation (e.g., the current lane, the adjacent lane, one or more lines delineating such lane(s), and/or the like); and based at least in part on the determined type, magnitude, and/or associated object(s), the computing system can determine whether to execute the motion plan (e.g., determine to execute the motion plan).

In some embodiments, the computing system can generate, store, and/or the like log data indicating, for each of the constraint(s) that would be violated, the type, magnitude, and/or associated object(s) of the violation of the constraint.

In some embodiments, the computing system can determine that execution of the motion plan would violate multiple of the constraint(s). In some of such embodiments, the computing system can determine: relative criticality of the constraints that would be violated; a most critical of the constraints that would be violated (e.g., based at least in part on the relative criticality, and/or the like); and/or based at least in part on the most critical of the constraints, whether to execute the motion plan.

In some embodiments, the computing system can determine the relative criticality based at least in part on determined types, magnitudes, and/or associated object(s) of the violations of the constraints. For example, the computing system can determine that the constraint corresponding to physical interaction between the autonomous vehicle and the travelway boundary (e.g., hitting the curb, and/or the like) is relatively more critical than the constraint corresponding to crossing, exceeding, and/or the like the travelway boundary (e.g., the legal, minor intrusion into the adjacent lane, and/or the like).

Additionally or alternatively, the computing system can determine the relative criticality based at least in part on a predetermined heuristic that indicates relative criticality of the predetermined constraint(s) irrespective of the environment. For example, such a heuristic could indicate constraints corresponding to physical interactions with travelway boundaries are relatively more critical than constraints corresponding to crossing, exceeding, and/or the like travelway boundaries.

In some embodiments, the computing system can determine (e.g., based at least in part on its type, magnitude, associated object(s), and/or the like) that a violation, of a constraint the computing system has determined would be violated if the motion plan were executed, can be mitigated by modifying the motion plan. In some of such embodiments, the computing system can modify (e.g., based at least in part on the type, magnitude, associated object(s), and/or the like of the violation) the motion plan to produce a modified motion plan that mitigates the violation; and the computing system can interface (e.g., via a vehicle-control system, and/or the like) with one or more controls of the autonomous vehicle to execute the modified motion plan. For example, such a modification can reduce the speed of the autonomous vehicle prior to physical interaction between the autonomous vehicle and the travelway boundary (e.g., hitting the curb, and/or the like).

In some embodiments, responsive to a determination that execution of the motion plan by the autonomous vehicle would violate at least one of the constraint(s), the computing system can interface (e.g., via a vehicle-control system, and/or the like) with one or more controls of the autonomous vehicle to execute a motion plan to bring the autonomous vehicle to a safe stop. For example, responsive to a determination that execution of the motion plan would result in physical interaction between the autonomous vehicle and the travelway boundary (e.g., hitting the curb, and/or the like), the computing system can interface with one or more controls (e.g., associated with braking, steering, and/or the like) to execute a motion plan (e.g., previously generated by the computing system, generated simultaneously or contemporaneously with the motion plan being validated, and/or the like) configured to bring the autonomous vehicle to a safe stop, for example, prior to physical interaction between the autonomous vehicle and the travelway boundary (e.g., hitting the curb, and/or the like).

In some of such embodiments, the computing system can be configured to interface with the control(s) to execute the motion plan to bring the autonomous vehicle to a safe stop in response to a determination by the computing system that a threshold amount of time (e.g., a timeout period, and/or the like) has elapsed without the computing system receiving data indicating a motion plan of the autonomous vehicle through the environment for which the computing system has determined execution by the autonomous vehicle would not violate the constraint(s). For example, the computing system can be configured to provide an opportunity for generation of a subsequent motion plan obviating the constraint violation(s) the computing system has determined would result from execution of the current motion plan.

In some embodiments, the computing system can be configured to receive, for each of evenly spaced cycles, data indicating a new motion plan for the autonomous vehicle. For example, the computing system can generate a new motion plan, receive data indicating the new motion plan, determine whether execution of the new motion plan would violate the constraint(s), and/or the like during each evenly spaced, periodic, and/or the like cycle of the computing system (e.g., a fixed number of times per second, and/or the like). In some of such embodiments, the threshold amount of time can be a predetermined number of such cycles. Additionally or alternatively, the computing system can determine the threshold amount of time based at least in part on the type(s), magnitude(s), associated object(s), and/or the like of the violation(s). For example, the computing system can be configured to wait less cycles for constraints corresponding to physical interactions with travelway boundaries (e.g., hitting a curb, and/or the like) than for constraints corresponding to crossing, exceeding, and/or the like travelway boundaries (e.g., a legal, minor intrusion into an adjacent lane, and/or the like).

In some embodiments, the computing system can generate (e.g., using a machine-learning model, and/or the like) a new motion plan for the autonomous vehicle, for example, a motion plan that obviates, mitigates, and/or the like the violation(s). In some of such embodiments, the computing system can generate the new motion plan based at least in part on the log data (e.g., the type(s), magnitude(s), associated object(s), and/or the like of the violation(s)). For example, the computing system can be configured to generate motion plans for the autonomous vehicle based at least in part on priorities assigned to objects of the environment, and/or using cost functions associated with such objects (e.g., with the goal of generating a motion plan that optimizes overall cost, and/or the like); and generating the new motion plan for the autonomous vehicle can include determining (e.g., based at least in part on the log data, and/or the like) one or more of such priorities, one or more aspects of such cost functions, and/or the like.

Additionally or alternatively, the computing system can be configured to generate a new motion plan (e.g., warm start, and/or the like) based at least in part on a base motion plan (e.g., the previously generated motion plan, and/or the like); and generating the new motion plan can include determining (e.g., based at least in part on the log data, and/or the like) the base motion plan, one or more aspects of the base motion plan, and/or the like. For example, the computing system can be configured to generate motion plans that optimize overall cost, to iteratively modify (e.g., based at least in part on more recently generated data describing the environment, and/or the like) previously generated plans to optimize the overall cost, and/or the like; such configuration can result in plans that locally optimize cost but fail to do so globally; the violation(s) can indicate the current motion plan may be such a plan; and the computing system can determine a base motion plan, one or more aspects thereof, and/or the like, from which the computing system can generate a new motion plan, for example, a plan less likely to fail to optimize cost globally to the extent of the previously generated plan, and/or the like.

The technology described herein can provide a number of technical effects and benefits. For example, validating generated motion plans prior to their potential execution by an autonomous vehicle can support safer operation of the autonomous vehicle, while allowing motion plans for the autonomous vehicle to be generated in a manner (e.g., based at least in part on cost optimization, and/or the like) that may not guarantee every generated motion plan will comply with predetermined constraint(s), and/or the like. Additionally or alternatively, the technology described herein can enable more efficient generation of motion plans, thereby conserving computing resources (e.g., processing capacity, memory, storage, bandwidth, and/or the like).

With reference now to the Figures, example embodiments of the present disclosure will be discussed in further detail.

Figure 1:
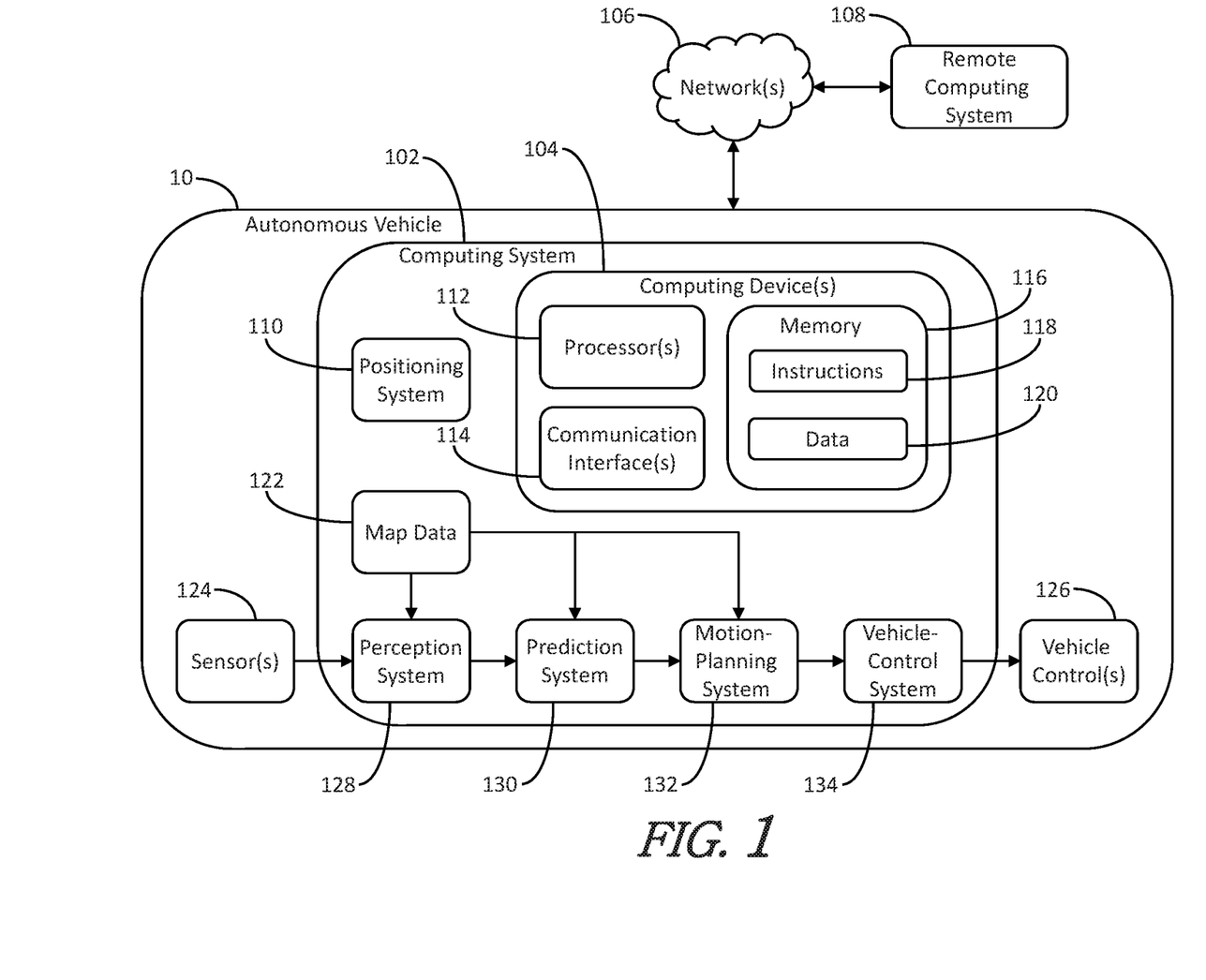
FIG. 1 depicts an example autonomous vehicle according to example embodiments of the present disclosure.

FIG. 1 depicts an example autonomous vehicle according to example embodiments of the present disclosure. Referring to FIG. 1, autonomous vehicle 10 can be capable of sensing its environment, navigating its environment with minimal or no human input, and/or the like. Autonomous vehicle 10 can be a ground-based autonomous vehicle (e.g., car, truck, bus, and/or the like), an air-based autonomous vehicle (e.g., airplane, drone, helicopter, and/or the like), and/or other type of vehicle (e.g., watercraft, and/or the like). Autonomous vehicle 10 can include one or more sensors 124, computing system 102, and one or more vehicle controls 126. Computing system 102 can assist in controlling autonomous vehicle 10. For example, computing system 102 can receive data generated by sensor(s) 124, attempt to comprehend an environment surrounding autonomous vehicle 10 by performing various processing techniques on the data generated by sensor(s) 124, generate, determine, select, and/or the like a motion plan for navigating autonomous vehicle 10 through, within, and/or the like such surrounding environment, and/or the like. Computing system 102 can interface with vehicle control(s) 126 to operate autonomous vehicle 10 (e.g., in accordance with the motion plan, and/or the like).

Computing system 102 can include one or more computing devices 104. Computing device(s) 104 can include circuitry configured to perform one or more operations, functions, and/or the like described herein. For example, computing device(s) 104 can include one or more processor(s) 112, one or more communication interfaces 114, and memory 116 (e.g., one or more hardware components for storing executable instructions, data, and/or the like). Communication interface(s) 114 can enable computing device(s) 104 to communicate with one another, and/or can enable autonomous vehicle 10 (e.g., computing system 102, computing device(s) 104, and/or the like) to communicate with one or more computing systems, computing devices, and/or the like distinct from autonomous vehicle 10 (e.g., computing system 108, and/or the like). Memory 116 can include (e.g., store, and/or the like) instructions 118 and data 120. When executed by processor(s) 112, instructions 118 can cause autonomous vehicle 10 (e.g., computing system 102, computing device(s) 104, and/or the like) to perform one or more operations, functions, and/or the like described herein. Data 120 can include, represent, and/or the like information associated with such operations, functions, and/or the like, data generated by sensor(s) 124, and/or the like.

Computing system 102 can be physically located onboard autonomous vehicle 10, and computing system 108 can be distinct and/or remotely located from autonomous vehicle 10. One or more networks 106 (e.g., wired networks, wireless networks, and/or the like) can interface autonomous vehicle 10 (e.g., computing system 102, computing device(s) 104, and/or the like) with computing system 108, which can include one or more computing devices analogous to computing device(s) 104, one or more components (e.g., memory, processors, communication interfaces, and/or the like) analogous to those of computing device(s) 104, and/or the like. Irrespective of attribution described or implied herein, unless explicitly indicated otherwise, the operations, functions, and/or the like described herein can be performed by computing system(s) 102 and/or 108 (e.g., by computing system 102, by computing system 108, by a combination of computing systems 102 and 108, and/or the like).

Computing system 102 can include positioning system 110, which can include one or more devices, circuitry, and/or the like for analyzing, approximating, determining, and/or the like one or more geographic positions of autonomous vehicle 10. For example, positioning system 110 can analyze, approximate, determine, and/or the like such position(s) using one or more inertial sensors, triangulations and/or proximities to network components (e.g., cellular towers, WiFi access points, and/or the like), satellite positioning systems, network addresses, and/or the like. Computing system 102 can include perception system 128, prediction system 130, and motion-planning system 132, which can cooperate to perceive a dynamic environment surrounding autonomous vehicle 10, generate, determine, select, and/or the like a motion plan for autonomous vehicle 10, and/or the like.

Perception system 128 can receive data from sensor(s) 124, which can be coupled to or otherwise included within autonomous vehicle 10. Sensor(s) 124 can include, for example, one or more cameras (e.g., visible spectrum cameras, infrared cameras, and/or the like), light detection and ranging (LIDAR) systems, radio detection and ranging (RADAR) systems, and/or the like. Sensor(s) 124 can generate data including information that describes one or more locations, velocities, vectors, and/or the like of objects in the environment surrounding autonomous vehicle 10. For example, a LIDAR system can generate data indicating the relative location (e.g., in three-dimensional space relative to the LIDAR system, and/or the like) of a number of points corresponding to objects that have reflected a ranging laser of the LIDAR system. Such a LIDAR system can, for example, measure distances by measuring the interference between outgoing and incoming light waves, measuring the time of flight (TOF) it takes a short laser pulse to travel from a sensor to an object and back, calculating the distance based at least in part on the TOF with respect to the known speed of light, based at least in part on a phase-shift with known wavelength, and/or the like. As another example, a RADAR system can generate data indicating one or more relative locations (e.g., in three-dimensional space relative to the RADAR system, and/or the like) of a number of points corresponding to objects that have reflected a ranging radio wave of the RADAR system. For example, radio waves (e.g., pulsed, continuous, and/or the like) transmitted by such a RADAR system can reflect off an object and return to a receiver of the RADAR system, generating data from which information about the object's location, speed, and/or the like can be determined. As another example, for one or more cameras, various processing techniques, for example, range-imaging techniques (e.g., structure from motion, structured light, stereo triangulation, and/or the like) can be performed to identify one or more locations (e.g., in three-dimensional space relative to the camera(s), and/or the like) of a number of points corresponding to objects depicted in imagery captured by the camera(s).

Perception system 128 can retrieve, obtain, and/or the like map data 122, which can provide information about an environment surrounding autonomous vehicle 10. For example, map data 122 can provide information regarding: the identity and location of different travelways (e.g., roadways, and/or the like), road segments, buildings, other static items or objects (e.g., lampposts, crosswalks, curbing, and/or the like); the location and directions of traffic lanes (e.g., the location and/or direction of a parking lane, turning lane, bicycle lane, and/or the like); traffic-control data (e.g., the location and/or instructions of signage, traffic lights, other traffic-control devices, and/or the like); other map data providing information that can assist computing system 102 in comprehending, perceiving, and/or the like an environment surrounding autonomous vehicle 10, its relationship thereto, and/or the like.

Perception system 128 can (e.g., based at least in part on data received from sensor(s) 124, map data 122, and/or the like) identify one or more objects proximate to autonomous vehicle 10 and determine, for each of such object(s), state data describing a current state of the object, for example, an estimate of the object's: size/footprint (e.g., as represented by a bounding shape such as a polygon, polyhedron, and/or the like); class (e.g., vehicle, pedestrian, bicycle, and/or the like); current location (also referred to as position), speed (also referred to as velocity), acceleration, heading, orientation, yaw rate; and/or the like. In some embodiments, perception system 128 can determine such state data for each object over a number of iterations, for example, updating, as part of each iteration, the state data for each object.

Accordingly, perception system 128 can detect, track, and/or the like such object(s) over time.

Prediction system 130 can receive state data from perception system 128 and can predict (e.g., based at least in part on such state data, and/or the like) one or more future locations for each object. For example, prediction system 130 can predict where each object will be located within the next five seconds, ten seconds, twenty seconds, and/or the like. As one example, an object can be predicted to adhere to its current trajectory according to its current speed. Additionally or alternatively, other prediction techniques, modeling, and/or the like can be used.

Motion-planning system 132 can generate, determine, select, and/or the like a motion plan for autonomous vehicle 10, for example, based at least in part on state data of object(s) provided by perception system 128, predicted future location(s) of object(s) provided by prediction system 130, and/or the like. For example, utilizing information about current location(s) of object(s), predicted future location(s) of object(s), and/or the like, motion-planning system 132 can generate, determine, select, and/or the like a motion plan for autonomous vehicle 10 that it determines (e.g., based at least in part on one or more operation parameters, and/or the like) best navigates autonomous vehicle 10 relative to the object(s). Motion-planning system 132 can provide the motion plan to vehicle-control system 134, which can directly and/or indirectly control autonomous vehicle 10 via vehicle control(s) 126 (e.g., one or more actuators, devices, and/or the like that control gas, power flow, steering, braking, and/or the like) in accordance with the motion plan.

Perception system 128, prediction system 130, motion-planning system 132, and/or vehicle-control system 134 can include logic utilized to provide functionality described herein. Perception system 128, prediction system 130, motion-planning system 132, and/or vehicle-control system 134 can be implemented in hardware (e.g., circuitry, and/or the like), firmware, software configured to control one or more processors, one or more combinations thereof, and/or the like. For example, instructions 118, when executed by processor(s) 112, can cause autonomous vehicle 10 (e.g., computing system 102, computing device(s) 104, and/or the like) to implement functionality of perception system 128, prediction system 130, motion-planning system 132, and/or vehicle-control system 134 described herein.

Figure 2:
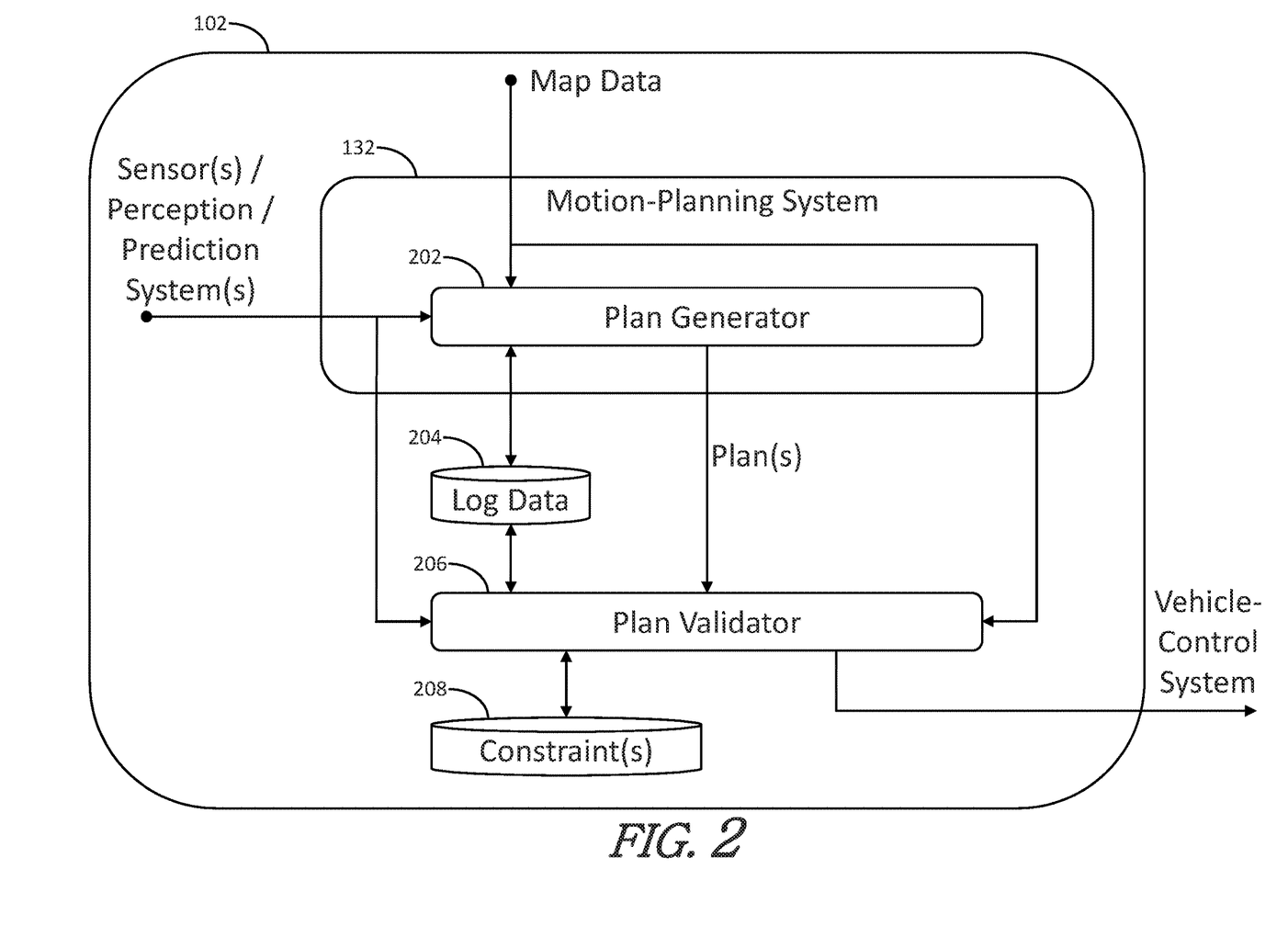
FIG. 2 depicts example aspects of a computing system of an autonomous vehicle according to example embodiments of the present disclosure.

FIG. 2 depicts example aspects of a computing system of an autonomous vehicle according to example embodiments of the present disclosure. Referring to FIG. 2, computing system 102 can include motion-planning system 132 and plan validator 206.

Motion-planning system 132 can include plan generator 202. Plan generator 202 can interface with map data 122, prediction system 130, perception system 128, sensor(s) 124, and/or the like. For example, plan generator 202 can be configured to receive (e.g., from map data 122, and/or the like) data describing one or more aspects of an environment of autonomous vehicle 10 (e.g., locations of travelways, lanes within travelways, traffic signage, signals, and/or the like). Similarly, plan generator 202 can be configured to receive (e.g., from perception system 128, and/or the like) data indicating one or more objects of such environment (e.g., other vehicles, pedestrians, buildings, and/or the like) perceived by perception system 128 based at least in part on data generated by sensor(s) 124. Additionally or alternatively, plan generator 202 can be configured to receive (e.g., from prediction system 130, and/or the like) data indicating one or more predicted locations (e.g., future locations, and/or the like) of such object(s) determined by prediction system 130 based at least in part on data generated by sensor(s) 124.

Data received by plan generator 202 (e.g., from map data 122, prediction system 130, perception system 128, sensor(s) 124, and/or the like) can include one or more inputs utilized by plan generator 202 to generate a motion plan (e.g., trajectory, and/or the like) of autonomous vehicle 10 through its environment. For example, plan generator 202 can be configured to generate such a motion plan using a machine-learning model, an ILQR, and/or the like.

Plan validator 206 can interface with plan generator 202, map data 122, prediction system 130, perception system 128, sensor(s) 124, and/or the like. For example, plan validator 206 can be configured to receive (e.g., from plan generator 202, and/or the like) data indicating a motion plan generated by plan generator 202. Similarly, plan validator 206 can be configured to receive (e.g., from plan generator 202, map data 122, prediction system 130, perception system 128, sensor(s) 124, and/or the like) data indicating the input(s) utilized by plan generator 202 in generating the motion plan.

Plan validator 206 can interface with (e.g., read, retrieve, and/or the like) one or more predetermined constraints 208 applicable to motion plans for autonomous vehicle 10. Constraint(s) 208 can include, for example, autonomous vehicle 10 avoiding: a collision with an object of the environment (e.g., another vehicle, a pedestrian, a building, an object in the travelway, and/or the like); physical interaction with a travelway boundary of the environment (e.g., a curb, shoulder, median, sidewalk, building, and/or the like); crossing, exceeding, and/or the like a travelway boundary of the environment (e.g., a line delineating a lane of a travelway, and/or the like); violating a traffic law of the environment (e.g., failing to yield to another vehicle, a pedestrian, and/or the like, failing to comply with a traffic signal or signage, crossing a solid and/or double line delineating a lane of a travelway, and/or the like); and/or violating one or more vehicle-platform parameters of autonomous vehicle 10 (e.g., exceeding one or more steering, angle, force, acceleration, deceleration limits, and/or the like of autonomous vehicle 10).

In accordance with aspects of the disclosure, plan validator 206 can be configured to determine (e.g., based at least in part on received data indicating the motion plan generated by plan generator 202, the input(s) utilized by plan generator 202 in generating such motion plan, and/or the like) whether execution (e.g., by autonomous vehicle 10, and/or the like) of the motion plan generated by plan generator 202 would violate constraint(s) 208. Plan validator 206 can also be configured to determine (e.g., based at least in part on whether execution of the motion plan would violate constraint(s) 208, and/or the like) whether to execute the motion plan.

Plan validator 206 can interface with vehicle control(s) 126 (e.g., via vehicle-control system 134, and/or the like). For example, plan validator 206 can be configured to, responsive to a determination to execute the motion plan generated by plan generator 202, interface with vehicle control(s) 126 to execute the motion plan.

As will subsequently be described in greater detail, plan generator 202 and/or plan validator 206 can interface with (e.g., generate, read, retrieve, modify, store, and/or the like) log data 204.

Figure 3:
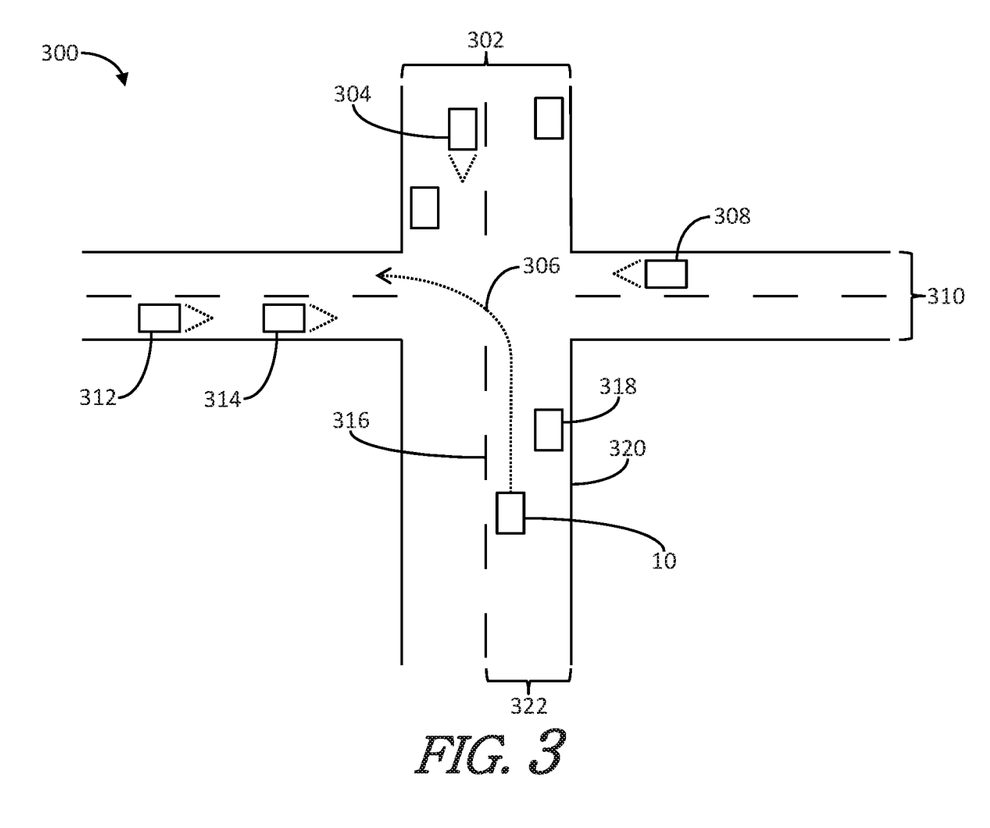
FIG. 3 depicts an example environment of an autonomous vehicle according to example embodiments of the present disclosure.

FIG. 3 depicts an example environment of an autonomous vehicle according to example embodiments of the present disclosure. Referring to FIG. 3, scene 300 depicts an example environment of autonomous vehicle 10 that includes an intersection of travelways 302 and 310. Autonomous vehicle 10 can be traveling along trajectory 306 in lane 322 of travelway 302. Lane 322 can be delineated by boundary 316 (e.g., a line painted on the surface of travelway 302, and/or the like) and boundary 320 (e.g., a curb of travelway 302, and/or the like). Lane 322 can include vehicle 318 (e.g., parked alongside boundary 320, and/or the like), and travelway 302 can include vehicle 304 (e.g., traveling in a lane adjacent to lane 322 and in the opposite direction of the direction autonomous vehicle 10 is traveling, and/or the like). Travelway 302 can be perpendicular to and on a common grade with travelway 310, thereby forming an intersection with travelway 310, which can include vehicles 308, 312, and 314 (e.g., vehicles 312 and 314 can be traveling in a common lane adjacent to a lane in which vehicle 308 can be traveling in the opposite direction of the direction vehicles 312 and 314 are traveling, and/or the like).

Figure 4:
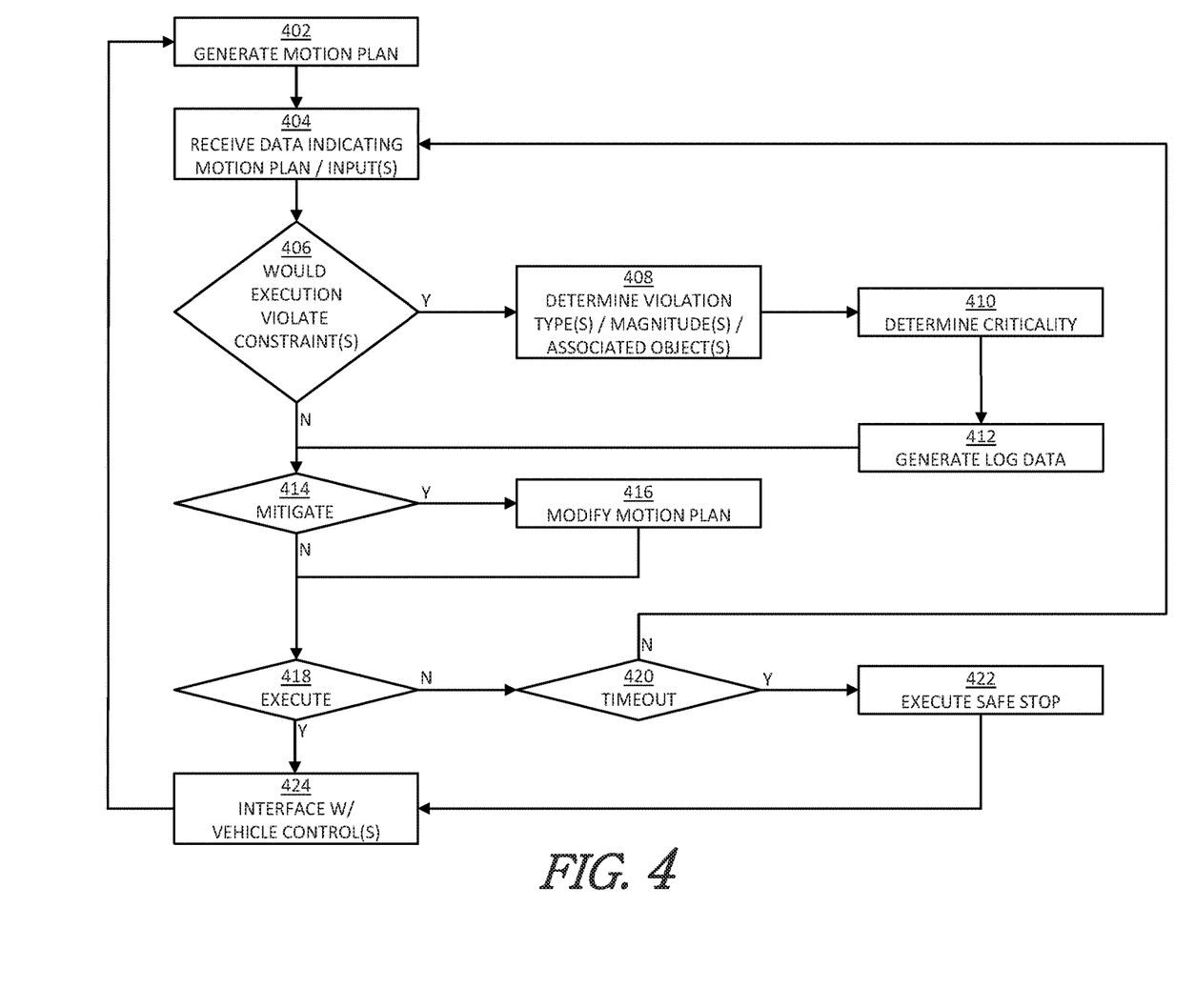
FIG. 4 depicts example methods according to example embodiments of the present disclosure.

FIG. 4 depicts example methods according to example embodiments of the present disclosure. Referring to FIG. 4, at (402), a computing system can generate a motion plan of an autonomous vehicle through its environment. For example, plan generator 202 can generate (e.g., using a machine-learning model, an ILQR, and/or the like) a motion plan (e.g., describing trajectory 306, and/or the like) of autonomous vehicle 10 through the environment depicted by scene 300. The motion plan can be generated based at least in part on one or more inputs. For example, plan generator 202 can generate the motion plan based at least in part on one or more inputs included in data received by plan generator 202 (e.g., from map data 122, prediction system 130, perception system 128, sensor(s) 124, and/or the like).

At (404), the computing system can receive data indicating the motion plan and data indicating the input(s) utilized in generating the motion plan. For example, plan validator 206 can receive (e.g., from plan generator 202, and/or the like) data indicating the motion plan generated by plan generator 202, and plan validator 206 can receive (e.g., from plan generator 202, map data 122, prediction system 130, perception system 128, sensor(s) 124, and/or the like) data indicating the input(s) utilized by plan generator 202 in generating the motion plan.

At (406), the computing system can determine (e.g., based at least in part on the data describing the motion plan, the data describing the input(s) utilized in generating the motion plan, and/or the like) whether execution of the motion plan by the autonomous vehicle would violate one or more predetermined constraints applicable to motion plans for the autonomous vehicle. For example, plan validator 206 can determine (e.g., based at least in part on the data indicating the motion plan generated by plan generator 202, the data indicating the input(s) utilized by plan generator 202 in generating the motion plan, and/or the like) whether execution, by autonomous vehicle 10, of the motion plan generated by plan generator 202 would violate constraint(s) 208.

In some embodiments, the computing system can determine that execution of the motion plan by the autonomous vehicle would not violate the constraint(s). For example, plan validator 206 can determine execution, by autonomous vehicle 10, of the motion plan generated by plan generator 202 would not violate constraint(s) 208.

Responsive to such a determination, at (414), the computing system can determine whether one or more violations of the constraint(s) can be mitigated by modifying the motion plan. For example, plan validator 206 can determine whether one or more violations of constraint(s) 208 can be mitigated by modifying the motion plan generated by plan generator 202.

In some embodiments, the computing system can determine the violation(s) of the constraint(s) cannot be mitigated by modifying the motion plan. For example, plan validator 206 can determine (e.g., based at least in part on the determination that execution, by autonomous vehicle 10, of the motion plan generated by plan generator 202 would not violate constraint(s) 208, and/or the like) that one or more violations of constraint(s) 208 cannot be mitigated by modifying the motion plan generated by plan generator 202 (e.g., because there are no violations to mitigate, and/or the like).

Responsive to such a determination, at (418), the computing system can determine (e.g., based at least in part on whether execution of the motion plan by the autonomous vehicle would violate the constraint(s), and/or the like) whether to execute the motion plan. For example, plan validator 206 can determine (e.g., based at least in part on whether execution, by autonomous vehicle 10, of the motion plan generated by plan generator 202 would violate constraint(s) 208, and/or the like) whether to execute the motion plan generated by plan generator 202.

In some embodiments, the computing system can determine to execute the motion plan. For example, plan validator 206 can determine (e.g., based at least in part on the determination that execution, by autonomous vehicle 10, of the motion plan generated by plan generator 202 would not violate constraint(s) 208, and/or the like) to execute the motion plan generated by plan generator 202.

Responsive to such a determination, at (424), the computing system can interface, with one or more controls of the autonomous vehicle, to execute the motion plan, and at (402), the computing system can generate a new motion plan for the autonomous vehicle. For example, plan validator 206 can interface (e.g., via vehicle-control system 134, and/or the like) with vehicle control(s) 126 to execute the motion plan generated by plan generator 202, and plan generator 202 can generate a new motion plan for autonomous vehicle 10.

Returning to (406), in some embodiments, the computing system can determine that execution of the motion plan by the autonomous vehicle would violate at least one of the constraint(s), multiple of the constraint(s), and/or the like. For example, plan validator 206 can determine execution, by autonomous vehicle 10, of the motion plan generated by plan generator 202 would violate constraint(s) 208.

Responsive to such a determination, at (408), for each of the constraint(s) that would be violated, the computing system can determine: a type, magnitude, and/or the like of a violation of the constraint; one or more objects of the environment associated with such violation; and/or the like.

For example, constraint(s) 208 can include a constraint indicating autonomous vehicle 10 should avoid physical interaction with a travelway boundary (e.g., a curb, shoulder, median, sidewalk, building, and/or the like) of the environment depicted by scene 300 (e.g., boundary 320, and/or the like); plan validator 206 can determine (e.g., at (406), and/or the like) that execution, by autonomous vehicle 10, of the motion plan generated by plan generator 202 would result in physical interaction with boundary 320 (e.g., autonomous vehicle 10 hitting the curb, and/or the like); and plan validator 206 can determine a type (e.g., collision with an inanimate object, and/or the like) and/or magnitude (e.g., relatively significant, and/or the like) of the violation, and/or one or more objects of the environment associated with the violation (e.g., boundary 320, and/or the like).

Additionally or alternatively, constraint(s) 208 can include a constraint indicating autonomous vehicle 10 should avoid crossing, exceeding, and/or the like a travelway boundary (e.g., a line delineating a lane of a travelway, and/or the like) of the environment depicted by scene 300 (e.g., boundary 316, and/or the like); plan validator 206 can determine (e.g., at (406), and/or the like) that execution, by autonomous vehicle 10, of the motion plan generated by plan generator 202 would result in autonomous vehicle 10 crossing, exceeding, and/or the like boundary 316 (e.g., a legal, minor intrusion into an adjacent lane, and/or the like); and plan validator 206 can determine a type (e.g., legal intrusion of adjacent lane, and/or the like) and/or magnitude (e.g., relatively minor, and/or the like) of the violation, and/or one or more objects of the environment associated with the violation (e.g., boundary 316, and/or the like).

At (410), the computing system can determine: relative criticality of the constraint(s) that would be violated; and/or a most critical of the constraint(s) that would be violated (e.g., based at least in part on the relative criticality, and/or the like). For example, plan validator 206 can determine relative criticality of the constraint(s) of constraint(s) 208 that would be violated if autonomous vehicle 10 executed the motion plan generated by plan generator 202; and/or a most critical of the constraint(s) of constraint(s) 208 that would be violated if autonomous vehicle 10 executed the motion plan generated by plan generator 202.

In some embodiments, the computing system can determine the relative criticality based at least in part on determined types, magnitudes, and/or associated object(s) of the violations of the constraints. For example, plan validator 206 can determine that the constraint corresponding to physical interaction between autonomous vehicle 10 and boundary 320 (e.g., hitting the curb, and/or the like) is relatively more critical than the constraint corresponding to crossing, exceeding, and/or the like boundary 316 (e.g., the legal, minor intrusion into the adjacent lane, and/or the like).

Additionally or alternatively, the computing system can determine the relative criticality based at least in part on a predetermined heuristic that indicates relative criticality of the predetermined constraint(s) irrespective of the environment. For example, such a heuristic could indicate constraints corresponding to physical interactions with travelway boundaries are relatively more critical than constraints corresponding to crossing, exceeding, and/or the like travelway boundaries.

At (412), the computing system can generate, store, and/or the like log data indicating, for each of the constraint(s) that would be violated, the type, magnitude, and/or associated object(s) of the violation of the constraint. For example, plan validator 206 can generate, store, and/or the like log data 204, indicating, for each of the constraint(s) of constraint(s) 208 that would be violated if autonomous vehicle 10 executed the motion plan generated by plan generator 202, the type, magnitude, and/or associated object(s) of the violation of the constraint.

At (414), the computing system can determine whether one or more violations of the constraint(s) can be mitigated by modifying the motion plan. For example, plan validator 206 can determine (e.g., based at least in part on their type(s), magnitude(s), associated object(s), and/or the like) whether the violation(s), of the constraint(s) of constraint(s) 208 that would be violated if autonomous vehicle 10 executed the motion plan generated by plan generator 202, can be mitigated by modifying the motion plan generated by plan generator 202.

In some embodiments, the computing system can determine a violation of the constraint(s) can be mitigated by modifying the motion plan. For example, plan validator 206 can determine (e.g., based at least in part on its type, magnitude, associated object(s), and/or the like) that a violation of the constraint corresponding to physical interaction between autonomous vehicle 10 and boundary 320 (e.g., hitting the curb, and/or the like) can be mitigated by modifying the motion plan generated by plan generator 202.

Responsive to such a determination, at (416), the computing system can modify (e.g., based at least in part on the type, magnitude, associated object(s), and/or the like of the violation) the motion plan to produce a modified motion plan that mitigates the violation. For example, plan validator 206 can modify (e.g., based at least in part on the type, magnitude, associated object(s), and/or the like of the violation of the constraint corresponding to physical interaction between autonomous vehicle 10 and boundary 320, and/or the like) the motion plan generated by plan generator 202 to mitigate the violation of the constraint corresponding to physical interaction between autonomous vehicle 10 and boundary 320 (e.g., to reduce the speed of autonomous vehicle 10 prior to physical interaction between autonomous vehicle 10 and boundary 320, and/or the like). In some embodiments, the computing system can determine whether execution of the modified motion plan by the autonomous vehicle would violate at least one of the constraint(s), multiple of the constraint(s), and/or the like. For example, plan validator 206 can determine whether execution, by autonomous vehicle 10, of the modified motion plan would violate constraint(s) 208.

At (418), the computing system can determine (e.g., based at least in part on whether execution of the motion plan by the autonomous vehicle would violate the constraint(s); the determined type(s), magnitude(s), and/or associated object(s) of the violation(s) of the constraint(s) that would be violated; and/or the like) whether to execute the motion plan. For example, plan validator 206 can determine (e.g., based at least in part on whether execution, by autonomous vehicle 10, of the motion plan generated by plan generator 202 would violate constraint(s) 208; the determined type(s), magnitude(s), and/or associated object(s) of the violation(s) of the constraint(s) of constraint(s) 208 that would be violated if autonomous vehicle 10 executed the motion plan generated by plan generator 202; and/or the like) whether to execute the motion plan generated by plan generator 202.

In some embodiments, the computing system can determine to execute the motion plan. For example, plan validator 206 can determine (e.g., based at least in part on the determined type, magnitude, and/or associated object(s) of the violation of the constraint corresponding to physical interaction between autonomous vehicle 10 and boundary 320, and/or the like) to execute the modified motion plan.

Responsive to such a determination, at (424), the computing system can interface, with one or more controls of the autonomous vehicle, to execute the motion plan, and at (402), the computing system can generate a new motion plan for the autonomous vehicle. For example, plan validator 206 can interface (e.g., via vehicle-control system 134, and/or the like) with vehicle control(s) 126 to execute the modified motion plan, and plan generator 202 can generate a new motion plan for autonomous vehicle 10.

Returning to (414), in some embodiments, the computing system can determine the violation(s) of the constraint(s) cannot be mitigated by modifying the motion plan. For example, plan validator 206 can determine (e.g., based at least in part on their type(s), magnitude(s), associated object(s), and/or the like) that the violation(s), of the constraint(s) of constraint(s) 208 that would be violated if autonomous vehicle 10 executed the motion plan generated by plan generator 202, cannot be mitigated by modifying the motion plan generated by plan generator 202.

Responsive to such a determination, at (418), the computing system can determine (e.g., based at least in part on whether execution of the motion plan by the autonomous vehicle would violate the constraint(s); the determined type(s), magnitude(s), and/or associated object(s) of the violation(s) of the constraint(s) that would be violated; the determined relative criticality of the constraint(s) that would be violated; the determined most critical of the constraint(s) that would be violated; and/or the like) whether to execute the motion plan. For example, plan validator 206 can determine (e.g., based at least in part on whether execution, by autonomous vehicle 10, of the motion plan generated by plan generator 202 would violate constraint(s) 208; the determined type(s), magnitude(s), and/or associated object(s) of the violation(s) of the constraint(s) of constraint(s) 208 that would be violated if autonomous vehicle 10 executed the motion plan generated by plan generator 202; the determined relative criticality of the constraint(s) of constraint(s) 208 that would be violated if autonomous vehicle 10 executed the motion plan generated by plan generator 202; the determined most critical of the constraint(s) of constraint(s) 208 that would be violated if autonomous vehicle 10 executed the motion plan generated by plan generator 202; and/or the like) whether to execute the motion plan generated by plan generator 202.

In some embodiments, the computing system can determine not to execute the motion plan. For example, plan validator 206 can determine (e.g., based at least in part on the determination that execution, by autonomous vehicle 10, of the motion plan generated by plan generator 202 would violate the constraint(s) of constraint(s) 208; the determined type(s), magnitude(s), and/or associated object(s) of the violation(s) of the constraint(s) of constraint(s) 208 that would be violated if autonomous vehicle 10 executed the motion plan generated by plan generator 202; the determined relative criticality of the constraint(s) of constraint(s) 208 that would be violated if autonomous vehicle 10 executed the motion plan generated by plan generator 202; the determined most critical of the constraint(s) of constraint(s) 208 that would be violated if autonomous vehicle 10 executed the motion plan generated by plan generator 202; and/or the like) not to execute the motion plan generated by plan generator 202.

Responsive to such a determination, at (420), the computing system can determine whether a threshold amount of time (e.g., a timeout period, and/or the like) has elapsed without the computing system receiving data indicating a motion plan of the autonomous vehicle through the environment for which the computing system has determined execution by the autonomous vehicle would not violate the constraint(s). For example, plan validator 206 can determine whether a threshold amount of time has elapsed without plan validator 206 receiving (e.g., from plan generator 202, and/or the like) data indicating a motion plan of autonomous vehicle 10 through the environment depicted by scene 300 for which plan validator 206 has determined execution by autonomous vehicle 10 would not violate constraint(s) 208.

In some embodiments, the computing system can be configured to receive, for each of evenly spaced cycles, data indicating a new motion plan for the autonomous vehicle. For example, the computing system can generate a new motion plan, receive data indicating the new motion plan, determine whether execution of the new motion plan would violate the constraint(s), and/or the like during each evenly spaced, periodic, and/or the like cycle of the computing system (e.g., a fixed number of times per second, and/or the like). In some of such embodiments, the threshold amount of time can be a predetermined number of such cycles. Additionally or alternatively, the computing system can determine the threshold amount of time based at least in part on the type(s), magnitude(s), associated object(s), and/or the like of the violation(s). For example, the computing system can be configured to wait less cycles for constraints corresponding to physical interactions with travelway boundaries (e.g., hitting a curb, and/or the like) than for constraints corresponding to crossing, exceeding, and/or the like travelway boundaries (e.g., a legal, minor intrusion into an adjacent lane, and/or the like).

In some embodiments, the computing system can determine the threshold amount of time has lapsed. For example, plan validator 206 can determine the threshold amount of time has elapsed without plan validator 206 receiving (e.g., from plan generator 202, and/or the like) data indicating a motion plan of autonomous vehicle 10 through the environment depicted by scene 300 for which plan validator 206 has determined execution by autonomous vehicle 10 would not violate constraint(s) 208.

Responsive to such a determination, at (422), the computing system can determine to execute a motion plan (e.g., previously generated by the computing system, generated simultaneously or contemporaneously with the motion plan being validated, and/or the like) configured to bring the autonomous vehicle to a safe stop. For example, plan validator 206 can determine to execute a motion plan configured to bring autonomous vehicle 10 to a safe stop, for example, prior to physical interaction between autonomous vehicle 10 and boundary 320 (e.g., hitting the curb, and/or the like).

At (424), the computing system can interface, with one or more controls of the autonomous vehicle, to execute the motion plan, and at (402), the computing system can generate a new motion plan for the autonomous vehicle. For example, plan validator 206 can interface (e.g., via vehicle-control system 134, and/or the like) with vehicle control(s) 126 to execute the motion plan configured to bring autonomous vehicle 10 to a safe stop, and plan generator 202 can generate a new motion plan for autonomous vehicle 10.

Returning to (420), in some embodiments, the computing system can determine the threshold amount of time has not lapsed. For example, plan validator 206 can determine the threshold amount of time has not elapsed without plan validator 206 receiving (e.g., from plan generator 202, and/or the like) data indicating a motion plan of autonomous vehicle 10 through the environment depicted by scene 300 for which plan validator 206 has determined execution by autonomous vehicle 10 would not violate constraint(s) 208.

Responsive to such a determination, at (404), the computing system can receive data indicating a motion plan and data indicating input(s) utilized in generating the motion plan. For example, plan validator 206 can receive (e.g., from plan generator 202, and/or the like) data indicating a motion plan generated by plan generator 202, and plan validator 206 can receive (e.g., from plan generator 202, map data 122, prediction system 130, perception system 128, sensor(s) 124, and/or the like) data indicating input(s) utilized by plan generator 202 in generating the motion plan.

In some embodiments, the computing system can generate (e.g., using a machine-learning model, and/or the like) a new motion plan for the autonomous vehicle, for example, a motion plan that obviates, mitigates, and/or the like the violation(s). For example, plan generator 202 can generate a new motion plan for autonomous vehicle 10 (e.g., a motion plan that obviates, mitigates, and/or the like the violation(s) of the constraint(s) of constraint(s) 208 that would be violated if autonomous vehicle 10 executed the motion plan previously generated by plan generator 202, and/or the like).

In some of such embodiments, the computing system can generate the new motion plan based at least in part on the log data (e.g., the type(s), magnitude(s), associated object(s), and/or the like of the violation(s)). For example, plan generator 202 can generate the new motion plan for autonomous vehicle 10 based at least in part on log data 204 (e.g., the determined type(s), magnitude(s), and/or associated object(s) of the violation(s) of the constraint(s) of constraint(s) 208 that would be violated if autonomous vehicle 10 executed the motion plan previously generated by plan generator 202, and/or the like).

In some embodiments, plan generator 202 can be configured to generate motion plans for autonomous vehicle 10 based at least in part on priorities assigned to objects of the environment depicted by scene 300, and/or using cost functions associated with such objects (e.g., with the goal of generating a motion plan that optimizes overall cost, and/or the like); and generating the new motion plan for autonomous vehicle 10 can include determining (e.g., based at least in part on log data 204, and/or the like) one or more of such priorities, one or more aspects of such cost functions, and/or the like.

Additionally or alternatively, plan generator 202 can be configured to generate a new motion plan (e.g., warm start, and/or the like) based at least in part on a base motion plan (e.g., the motion plan previously generated by plan generator 202, and/or the like); and generating the new motion plan can include determining (e.g., based at least in part on log data 204, and/or the like) the base motion plan, one or more aspects of the base motion plan, and/or the like. For example, plan generator 202 can be configured to generate motion plans that optimize overall cost, to iteratively modify (e.g., based at least in part on more recently generated data describing the environment depicted by scene 300, and/or the like) plans previously generated by plan generator 202 to optimize the overall cost, and/or the like; such configuration can result in plans that locally optimize cost but fail to do so globally; the violation(s) of the constraint(s) of constraint(s) 208 that would be violated if autonomous vehicle 10 executed the motion plan previously generated by plan generator 202 can indicate the motion plan previously generated by plan generator 202 may be such a plan; and plan generator 202 and/or plan validator 206 can determine a base motion plan, one or more aspects thereof, and/or the like, from which plan generator 202 can generate a new motion plan, for example, a plan less likely to fail to optimize cost globally to the extent of the plan previously generated by plan generator 202, and/or the like.

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method comprising:
receiving, by a plan validator of an autonomous vehicle from a plan generator of the autonomous vehicle, data indicating a motion plan of the autonomous vehicle, wherein the data indicating the motion plan of the autonomous vehicle is indicative of a trajectory of the autonomous vehicle through an environment of the autonomous vehicle, wherein the motion plan is one of a plurality of motion plans generated by the plan generator based on one or more inputs associated with the environment, wherein the one or more inputs comprise object data generated by a perception system of the autonomous vehicle, wherein the motion plan is determined by the plan generator based on optimization of a plurality of cost functions, wherein the plan validator is separate and distinct from the plan generator;
receiving, by the plan validator, data indicating the one or more inputs utilized by the plan generator in generating the plurality of motion plans, wherein the data indicating the one or more inputs comprises the object data generated by the perception system of the autonomous vehicle; and
determining, by the plan validator and based at least in part on the data indicating the motion plan and the data indicating the one or more inputs, whether execution of the motion plan by the autonomous vehicle would violate one or more predetermined constraints applicable to the motion plan of the autonomous vehicle.

2. The computer-implemented method of claim 1, wherein the object data is indicative of one or more objects of the environment perceived by the perception system of the autonomous vehicle based at least in part on data generated by one or more sensors of the autonomous vehicle, and wherein the one or more inputs further comprise at least one of: map data describing one or more aspects of the environment or prediction data comprising one or more predicted locations of the one or more objects of the environment, determined by a prediction system of the autonomous vehicle based at least in part on the data generated by the one or more sensors of the autonomous vehicle.

3. The computer-implemented method of claim 1, wherein the one or more predetermined constraints comprise the autonomous vehicle avoiding at least one of:
a collision with an object of the environment;
physical interaction with a travelway boundary of the environment;
one or more of crossing or exceeding a travelway boundary of the environment;
violating a traffic law of the environment; or
violating one or more vehicle-platform parameters of the autonomous vehicle.

4. The computer-implemented method of claim 1, comprising, responsive to a determination that execution of the motion plan by the autonomous vehicle would not violate the one or more predetermined constraints, interfacing, by the plan validator and with one or more controls of the autonomous vehicle, to execute the motion plan.

5. The computer-implemented method of claim 1, comprising:
determining, by the plan validator, that execution of the motion plan by the autonomous vehicle would violate at least one constraint of the one or more predetermined constraints; and
for each constraint of the at least one constraint:
determining, by the plan validator, one or more of a type or magnitude of a violation of the constraint; and
determining, by the plan validator and based at least in part on the one or more of the type or magnitude of the violation of the constraint, whether to execute the motion plan.

6. The computer-implemented method of claim 5, comprising generating, by the plan validator, log data indicating, for each constraint of the at least one constraint, at least one of:
the one or more of the type or magnitude of the violation of the constraint; or
one or more objects of the environment associated with the violation of the constraint.

7. The computer-implemented method of claim 6, wherein the plurality of motion plans are generated using a machine-learning model, wherein a new motion plan for the autonomous vehicle is generated, by the plan generator based at least in part on the log data.

8. The computer-implemented method of claim 7, wherein generating the new motion plan comprises determining, for each constraint of the at least one constraint and based at least in part on the log data, at least one of:
one or more priorities assigned to the one or more objects of the environment associated with the violation of the constraint; or
one or more aspects of one or more of the plurality of cost functions that are associated with the one or more objects of the environment associated with the violation of the constraint.

9. The computer-implemented method of claim 7, wherein generating the new motion plan comprises:
determining, based at least in part on the log data, at least one of:
a base motion plan for the autonomous vehicle, or
one or more aspects of the base motion plan; and
generating, using the machine-learning model and based at least in part on the base motion plan, the new motion plan.

10. The computer-implemented method of claim 1, comprising, responsive to a determination that execution of the motion plan by the autonomous vehicle would violate at least one constraint of the one or more predetermined constraints, interfacing, by the plan generator and with one or more controls of the autonomous vehicle, to execute a different motion plan, the different motion plan being configured to bring the autonomous vehicle to a safe stop.

11. The computer-implemented method of claim 10, wherein the interfacing is performed responsive to a determination by the plan validator that a threshold amount of time has elapsed without the plan validator receiving data indicating a new motion plan of the autonomous vehicle through the environment for which the plan validator has determined execution by the autonomous vehicle would not violate the one or more predetermined constraints.

12. The computer-implemented method of claim 11, wherein:
the plan validator receives, for each cycle of a plurality of evenly spaced cycles, data indicating the new motion plan for the autonomous vehicle; and
the threshold comprises a predetermined number of the plurality of evenly spaced cycles.

13. The computer-implemented method of claim 11, comprising:
determining, by the plan validator, one or more of a type or magnitude of a violation of the at least one constraint; and
determining, by the plan validator and based at least in part on the one or more of the type or magnitude of the violation, the threshold amount of time.

14. The computer-implemented method of claim 1, comprising, responsive to a determination by the plan validator that execution of the motion plan by the autonomous vehicle would violate at least one constraint of the one or more predetermined constraints:
determining, by the plan validator, one or more of a type or magnitude of a violation of the at least one constraint;
modifying, by the plan validator and based at least in part on the one or more of the type or magnitude of the violation, the motion plan to produce a modified motion plan that mitigates the violation; and
interfacing, by the plan validator and with one or more controls of the autonomous vehicle, to execute the modified motion plan.

15. The computer-implemented method of claim 1, wherein:
determining whether execution of the motion plan by the plan validator would violate the one or more predetermined constraints comprises determining execution of the motion plan by the autonomous vehicle would violate multiple constraints of the one or more predetermined constraints; and
the method comprises determining, by the plan validator, relative criticality of the multiple constraints.

16. The computer-implemented method of claim 15, comprising:
determining, by the plan validator and based at least in part on the relative criticality, a most critical constraint of the multiple constraints; and
determining, by the plan validator and based at least in part on the most critical constraint, whether to execute the motion plan.

17. The computer-implemented method of claim 15, wherein determining the relative criticality comprises determining the relative criticality based at least in part on a predetermined heuristic that indicates relative criticality of the one or more predetermined constraints irrespective of the environment.

18. The computer-implemented method of claim 15, wherein:
the method comprises determining, by the plan validator, one or more of types or magnitudes of violations of the multiple constraints; and
determining the relative criticality comprises determining the relative criticality based at least in part on the one or more of the types or magnitudes of the violations.

19. A system comprising:
a plan generator configured to generate a plurality of motion plans for an autonomous vehicle, wherein each motion plan is indicative of a trajectory of the autonomous vehicle through an environment of the autonomous vehicle;
a plan validator that is separate and distinct from the plan generator;
one or more processors; and
a memory storing instructions that when executed by the one or more processors cause the system to perform operations comprising:
generating, by the plan generator of the autonomous vehicle, using a machine-learning model, and based at least in part on one or more inputs associated with the environment, the plurality of motion plans of the autonomous vehicle through the environment of the autonomous vehicle, wherein the one or more inputs comprise object data generated by a perception system of the autonomous vehicle;
receiving, by the plan validator of the autonomous vehicle from the plan generator of the autonomous vehicle, data indicating a motion plan of the autonomous vehicle, wherein the data indicating the motion plan of the autonomous vehicle is indicative of a trajectory of the autonomous vehicle through the environment of the autonomous vehicle, wherein the motion plan is one of the plurality of motion plans generated by the plan generator based on the one or more inputs associated with the environment, wherein the motion plan is determined by the plan generator based on optimization of a plurality of cost functions;
receiving, by the plan validator, data indicating the one or more inputs utilized by the plan generator in generating the plurality of motion plans, wherein the data indicating the one or more inputs comprises the object data generated by the perception system of the autonomous vehicle;
determining, by the plan validator of the autonomous vehicle and based at least in part on the motion plan and the one or more inputs, whether execution of the motion plan by the autonomous vehicle would violate one or more predetermined constraints applicable to the motion plan of the autonomous vehicle; and
determining, based at least in part on whether execution of the motion plan by the autonomous vehicle would violate the one or more predetermined constraints, whether to execute the motion plan.

20. An autonomous vehicle comprising:
one or more sensors configured to generate data describing an environment of the autonomous vehicle;
one or more vehicle controls configured to operate the autonomous vehicle;
a plan generator configured to generate a plurality of motion plans for an autonomous vehicle, wherein each motion plan is indicative of a trajectory of the autonomous vehicle through an environment of the autonomous vehicle;
a plan validator that is separate and distinct from the plan generator;
one or more processors; and
a memory storing instructions that when executed by the one or more processors cause:
the plan generator to generate, using a machine-learning model and based at least in part on one or more inputs determined based at least in part on data generated by the one or more sensors, a plurality of motion plans of the autonomous vehicle through the environment, wherein the one or more inputs comprise object data generated by a perception system of the autonomous vehicle;

the plan validator to:
- receive, from the plan generator of the autonomous vehicle, data indicating a motion plan of the autonomous vehicle, wherein the data indicating the motion plan of the autonomous vehicle is indicative of a trajectory of the autonomous vehicle through the environment of the autonomous vehicle, wherein the motion plan is one of the plurality of motion plans generated by the plan generator based on the one or more inputs associated with the environment, wherein the motion plan is determined by the plan generator based on optimization of a plurality of cost functions;
- receive data indicating the one or more inputs utilized by the plan generator in generating the plurality of motion plans, wherein the data indicating the one or more inputs comprises the object data generated by the perception system of the autonomous vehicle; and
- determine, based at least in part on the motion plan and the one or more inputs, whether execution of the motion plan by the autonomous vehicle would violate one or more predetermined constraints applicable to the motion plan of the autonomous vehicle.

* * * * *